(12) United States Patent
Kaminsky et al.

(10) Patent No.: US 8,290,681 B2
(45) Date of Patent: Oct. 16, 2012

(54) METHOD AND APPARATUS TO PRODUCE A SMOOTH INPUT SPEED PROFILE IN MODE FOR A HYBRID POWERTRAIN SYSTEM

(75) Inventors: Lawrence A. Kaminsky, Sterling Heights, MI (US); Anthony H. Heap, Ann Arbor, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 637 days.

(21) Appl. No.: 12/250,327

(22) Filed: Oct. 13, 2008

(65) Prior Publication Data

US 2009/0112417 A1    Apr. 30, 2009

Related U.S. Application Data

(60) Provisional application No. 60/983,257, filed on Oct. 29, 2007.

(51) Int. Cl.
*G06F 19/00* (2011.01)
*G06G 7/70* (2006.01)

(52) U.S. Cl. ............ 701/99; 701/54; 701/101; 701/110; 903/905; 903/906; 180/65.21; 180/65.225; 180/65.265; 180/65.28; 180/65.285

(58) Field of Classification Search .............. 701/22, 701/51, 54–60, 67–70, 93–95, 98–99, 101–115; 903/902–947; 180/65.1–65.31
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 2005/0065690 A1* | 3/2005 | Ashizawa et al. | 701/51 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |

(Continued)

*Primary Examiner* — Hussein Elchanti
*Assistant Examiner* — Rami Khatib

(57) ABSTRACT

A method for controlling a powertrain including an electro-mechanical transmission coupled to an engine and an electric machine includes monitoring a desired input speed; signal processing the desired input speed to create a lead control signal to control the engine, wherein the signal processing includes low pass filtering the desired input speed and applying system constraint limits upon the desired input speed; signal processing the desired input speed to create an immediate control signal to control the electric machine, wherein the signal processing includes delaying the desired input speed by a lead period, low pass filtering the desired input speed, and applying system constraint limits upon the desired input speed; and controlling the powertrain through a powertrain transition based upon the lead control signal and said immediate control signal.

10 Claims, 11 Drawing Sheets

U.S. PATENT DOCUMENTS

| | | |
|---|---|---|
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0030979 A1* | 2/2006 | Kuang et al. ............... 701/22 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0058154 A1* | 3/2008 | Ashizawa et al. ............ 477/5 |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |

| | | | | | | |
|---|---|---|---|---|---|---|
| 2009/0118929 A1 | 5/2009 | Heap | 2009/0118947 A1 | 5/2009 | Heap | |
| 2009/0118930 A1 | 5/2009 | Heap | 2009/0118948 A1 | 5/2009 | Heap | |
| 2009/0118931 A1 | 5/2009 | Kaminsky | 2009/0118949 A1 | 5/2009 | Heap | |
| 2009/0118932 A1 | 5/2009 | Heap | 2009/0118950 A1 | 5/2009 | Heap | |
| 2009/0118933 A1 | 5/2009 | Heap | 2009/0118951 A1 | 5/2009 | Heap | |
| 2009/0118934 A1 | 5/2009 | Heap | 2009/0118952 A1 | 5/2009 | Heap | |
| 2009/0118935 A1 | 5/2009 | Heap | 2009/0118954 A1 | 5/2009 | Wu | |
| 2009/0118936 A1 | 5/2009 | Heap | 2009/0118957 A1 | 5/2009 | Heap | |
| 2009/0118937 A1 | 5/2009 | Heap | 2009/0118962 A1 | 5/2009 | Heap | |
| 2009/0118938 A1 | 5/2009 | Heap | 2009/0118963 A1 | 5/2009 | Heap | |
| 2009/0118939 A1 | 5/2009 | Heap | 2009/0118964 A1 | 5/2009 | Snyder | |
| 2009/0118940 A1 | 5/2009 | Heap | 2009/0118969 A1 | 5/2009 | Heap | |
| 2009/0118941 A1 | 5/2009 | Heap | 2009/0118971 A1 | 5/2009 | Heap | |
| 2009/0118942 A1 | 5/2009 | Hsieh | 2009/0118999 A1 | 5/2009 | Heap | |
| 2009/0118943 A1 | 5/2009 | Heap | 2009/0144002 A1 | 6/2009 | Zettel | |
| 2009/0118944 A1 | 5/2009 | Heap | 2010/0042278 A1* | 2/2010 | Falkenstein | 701/22 |
| 2009/0118945 A1 | 5/2009 | Heap | | | | |
| 2009/0118946 A1 | 5/2009 | Heap | | | | |

* cited by examiner

METHOD AND APPARATUS TO PRODUCE A SMOOTH INPUT SPEED PROFILE IN MODE FOR A HYBRID POWERTRAIN SYSTEM

CROSS REFERENCE TO RELATED APPLICATIONS

This application claims the benefit of U.S. Provisional Application No. 60/983,257 filed on Oct. 29, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate an input torque to the transmission, independently of an input torque from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

Powertrain transitions include changes to powertrain output and shifts in the transmission. Numerous determinations must be made on the basis of available inputs to maintain operational control of the powertrain through transitions.

Transmissions within a hybrid powertrain, as described above, serve a number of functions by transmitting and manipulating torque in order to provide torque to an output member. In order to serve the particular function required, the transmission selects between a number of operating range states or configurations internal to the transmission defining the transfer of torque through the transmission. Known transmissions utilize operating range states including fixed gear states or states with a defined gear ratio. For example, a transmission can utilize four sequentially arranged fixed gear states and allow selection between the four gear states in order to provide output torque through a wide range of output member speeds. Additively or alternatively, known transmissions also allow for continuously variable operating range states or mode states, enabled for instance through the use of a planetary gear set, wherein the gear ratio provided by the transmission can be varied across a range in order to modulate the output speed and output torque provided by a particular set of inputs. Additionally, transmissions can operate in a neutral state, ceasing all torque from being transmitted through the transmission. Additionally, transmissions can operate in a reverse mode, accepting input torque in a particular rotational direction used for normal forward operation and reversing the direction of rotation of the output member. Through selection of different operating range states, transmissions can provide a range of outputs for a given input.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. However, changes in output torque required from the transmission, for instance, due to a change in operator pedal position or due to an operating range state shift, must be handled smoothly. Particularly difficult to manage are input torques, applied simultaneously to a transmission, with different reaction times to a control input. Based upon a single control input, the various devices can change respective input torques at different times, causing increased abrupt changes to the overall torque applied through the transmission. Abrupt or uncoordinated changes to the various input torques transmitted through a transmission can cause a perceptible change in acceleration or jerk in the vehicle, which can adversely affect vehicle drivability.

Clutches are devices well known in the art for engaging and disengaging shafts including the management of rotational velocity and torque differences between the shafts. Transmissions can operate with a single clutch transmitting reactive torque between inputs and an output. Transmission can operate with a plurality of clutches transmitting reactive torque between inputs and an output. Selection of operating range state depends upon the selective engagement of clutches, with different allowable combinations resulting in different operating range states.

A shift or transition from one operating range state to another operating range state involves transitioning at least one clutch state. An exemplary transition from one fixed gear state, including two clutches initially in a locked state, to another fixed gear state, including at least one different engaged clutch, involves unloading a first clutch, transitioning through an inertia speed phase state, and subsequently loading a second clutch. While output torque changes or interruptions due to clutch transitions are a normal part of transmission operating range state shifts, orderly management of the output torque changes reduces the impact of the shifts to drivability.

Input signals relating to desired operation of the vehicle must be transformed into commands that can approximate the desired operation while preserving drivability. Input signals and processors utilized to transform the signals into usable commands include a number of challenges that can adversely impact control of the powertrain. A method to employ techniques of signal processing in combination with signal strategies to coordinate commands throughout the powertrain based upon differing reaction times in various components would be beneficial to smooth powertrain operation.

SUMMARY

A method for controlling a powertrain including an electro-mechanical transmission coupled to an engine and an electric machine includes monitoring a desired input speed; signal processing the desired input speed to create a lead control signal to control the engine, wherein the signal processing includes low pass filtering the desired input speed and applying system constraint limits upon the desired input speed; signal processing the desired input speed to create an immediate control signal to control the electric machine, wherein the signal processing includes delaying the desired input speed by a lead period, low pass filtering the desired input speed, and applying system constraint limits upon the desired input speed; and controlling the powertrain through a powertrain transition based upon the lead control signal and said immediate control signal.

BRIEF DESCRIPTION OF THE DRAWINGS

One or more embodiments will now be described, by way of example, with reference to the accompanying drawings, in which.

DETAILED DESCRIPTION

Figure 1:
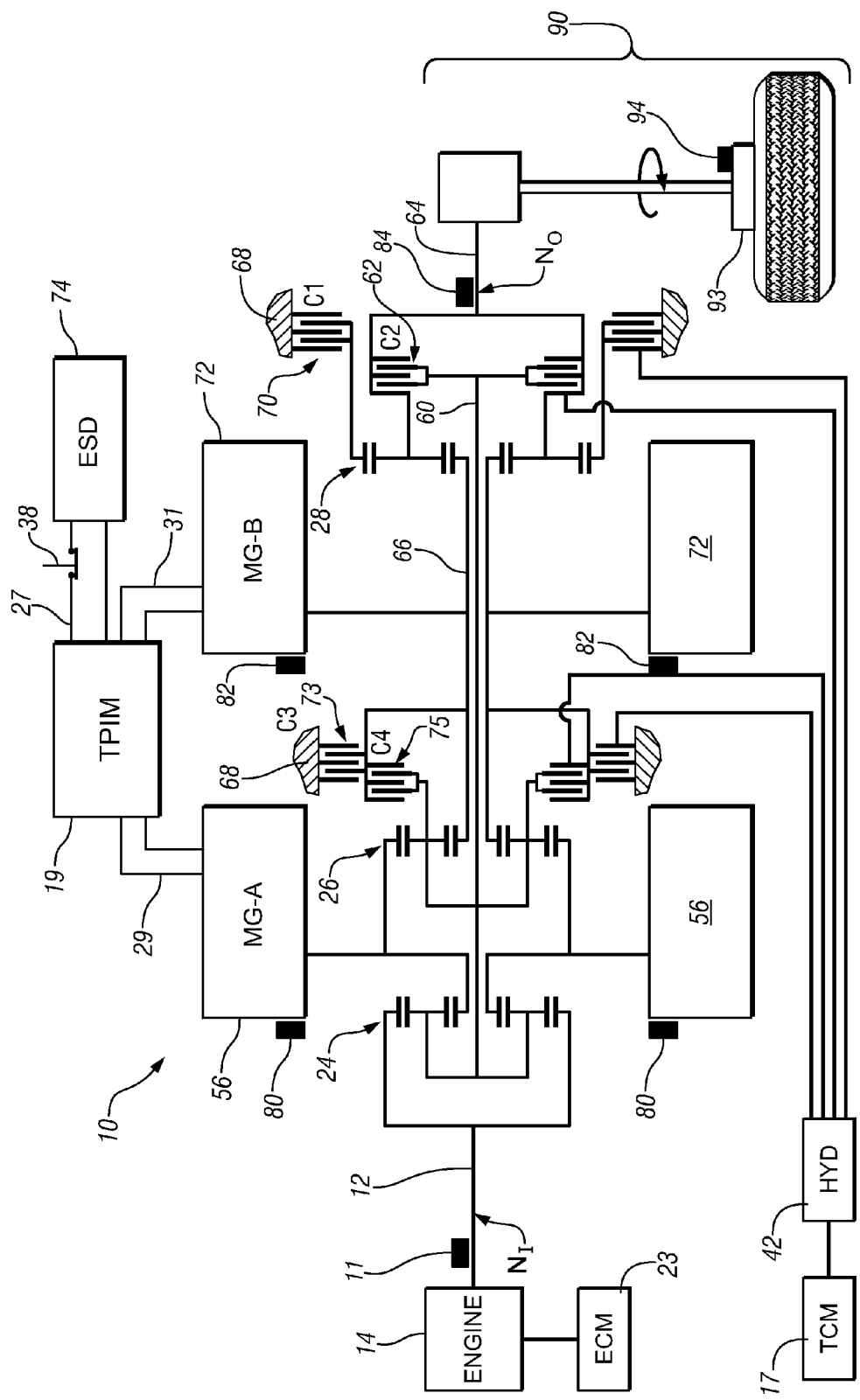
FIG. 1 is a schematic diagram of an exemplary powertrain comprising a two-mode, compound-split, electro-mechanical hybrid transmission operatively connected to an engine and first and second electric machines, in accordance with the present disclosure.
Figure 2:
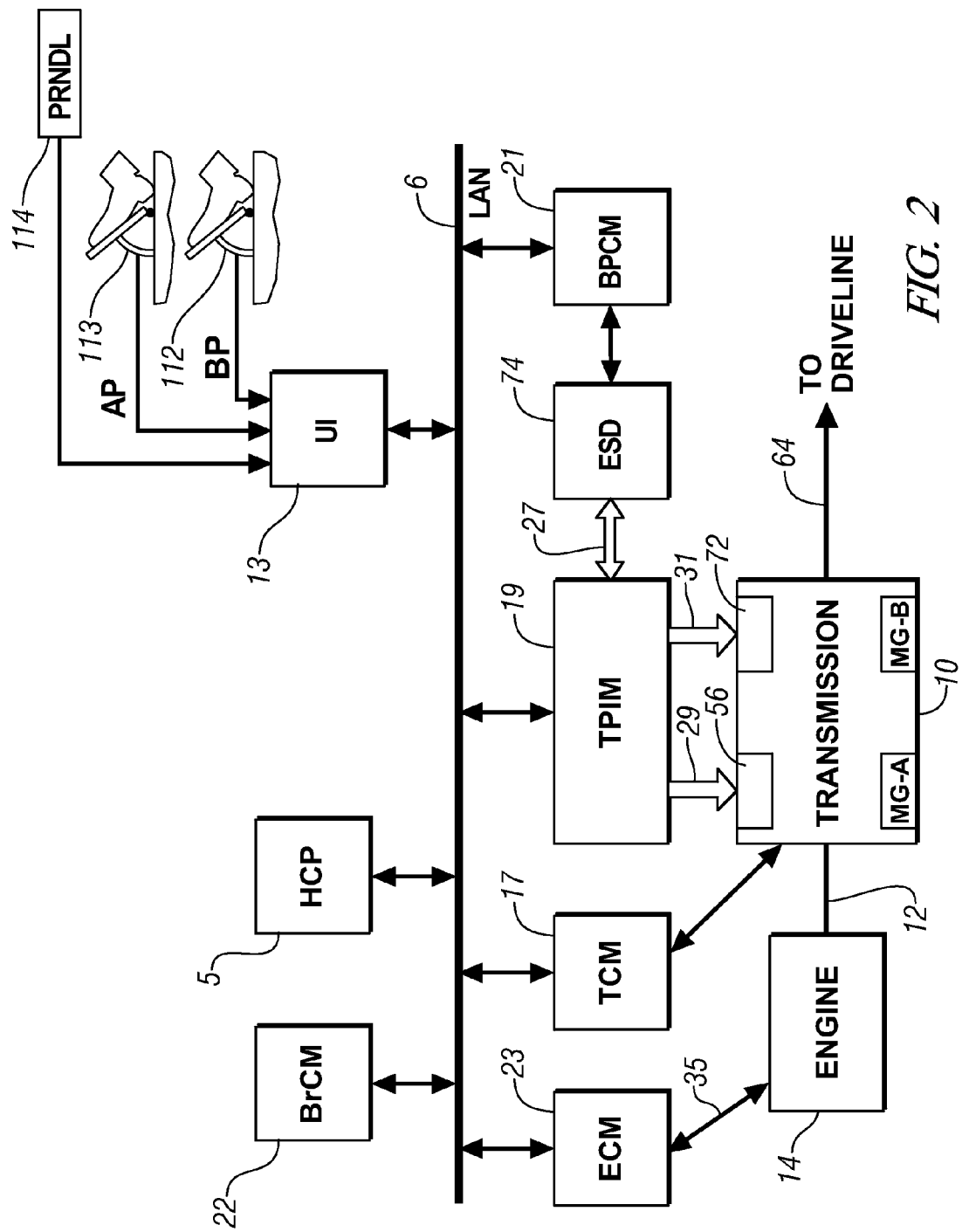
FIG. 2 is a schematic block diagram of an exemplary distributed control module system, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. B, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque requests to the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque request, clutch torques for the torque-transfer clutches C1 70, C2 62, C3 73, C4 75 of the transmission 10; and the torque requests for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque request from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine, initiated for example within a hybrid strategic control module of the HCP 5, which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

As discussed above, managing output torque in order to maintain drivability is a priority in controlling a hybrid powertrain. Any change in torque in response to a change in output torque request applied through the transmission results in a change to the output torque applied to the driveline, thereby resulting in a change in propelling force to the vehicle and a change in vehicle acceleration. The change in torque request can come from operator input, such a pedal position relating an operator torque request, automatic control changes in the vehicle, such as cruise control or other control strategy, or engine changes in response to environmental conditions, such as a vehicle experiencing an uphill or downhill grade. By controlling changes to various input torques transmitted through a transmission within a hybrid powertrain, abrupt changes in vehicle acceleration can be controlled and minimized in order to reduce adverse effects to drivability.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in operator torque request or as required to execute a transmission shift, creates reactions in each affected torque generating device in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 3:
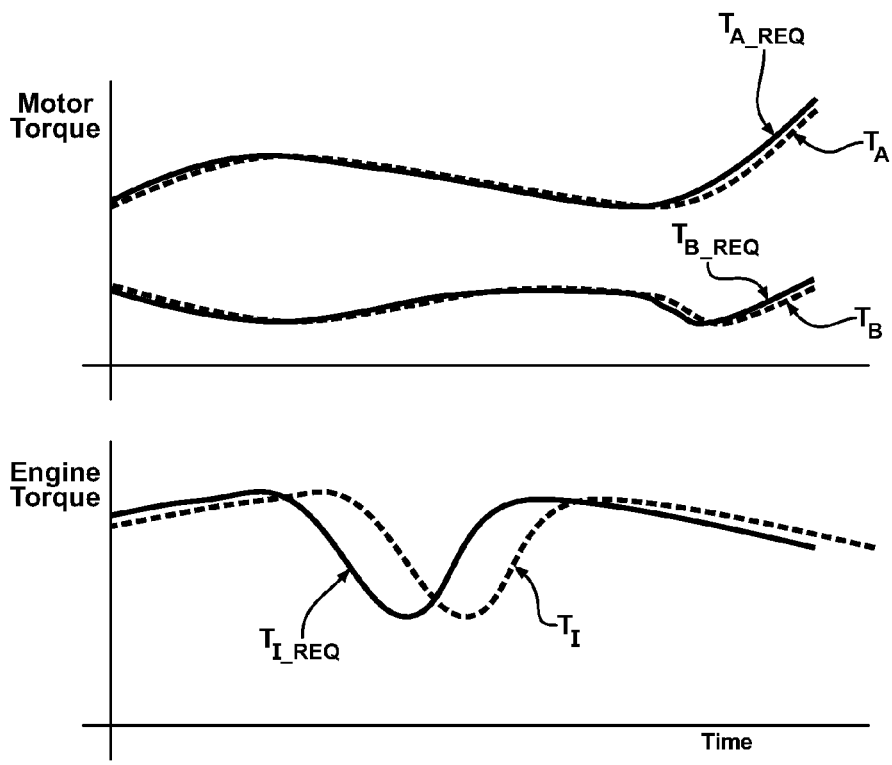
FIG. 3 graphically depicts reaction times of exemplary hybrid powertrain components to changes in torque request, in accordance with the present disclosure.

FIG. 3 graphically depicts reaction times of exemplary hybrid powertrain components to changes in torque request, in accordance with the present disclosure. Components to an exemplary hybrid powertrain system including an engine and two electric machines are exemplified. Torque requests and resulting changes in input torque produced by each torque generating device are illustrated. As described above, the data shows that electric machines quickly respond to changes in torque requests, whereas the engine follows changes in torque requests more slowly.

A method is disclosed wherein reactions times of the engine and of the electric machine or machines within a hybrid powertrain are utilized to control in parallel an lead immediate torque request, controlling the engine, and an immediate torque request, controlling the electric machines, the torque requests being coordinated by respective reaction times in order to substantially effect simultaneous changes to input torque.

Because, as discussed above, changes to input torque from the engine are known to involve consistently longer reactions times than changes to input torque from an electric machine, an exemplary embodiment of the disclosed method can implement changes in torque request to the engine and the electric machine, acting in parallel as described above, including a lead period to the more quickly reacting device, the electric motor. This lead period may be developed experimentally, empirically, predictively, through modeling or other techniques adequate to accurately predict engine and electric machine operation, and a multitude of lead periods might be used by the same hybrid powertrain, depending upon different engine settings, conditions, operating and ranges and vehicle conditions. An exemplary equation that can be used in conjunction with test data or estimates of device reaction times to calculate lead period in accordance with the present disclosure includes the following:

$$T_{Lead} = T_{Lead\ Reaction} - T_{Immediate\ Reaction}$$

$T_{Lead}$ equals the lead period for use in methods described herein. This equation assumes that two torque producing devices are utilized. $T_{Lead\ Reaction}$ represents the reaction time of the device with the longer reaction time, and $T_{Immediate\ Reaction}$ represents the reaction time of the device with the shorter reaction time. If a different system is utilized, comprising for example, an engine with a long lead period, a first electric machine with an intermediate lead period, and a second electric machine with a short lead period, lead periods can be developed comparing all of the torque generating devices. In this exemplary system, if all three torque generating devices are involved, two lead periods, one for the engine as compared to each of the electric machines, will be utilized to synchronize the responses in each of the devices. The same system at a different time might be operating with the engine off and disengaged from the transmission, and a lead period comparing the first electric machine and the second electric machine will be utilized to synchronize the responses in the two electric machines. In this way, a lead period can be developed coordinating reaction times between various torque generating devices can be developed.

One exemplary method to utilize lead periods to implement parallel torque requests to distinct torque generating devices in order to effect substantially simultaneous changes to output torque in response to a change in operator torque request includes issuing substantially immediately a change to the engine torque immediate request, initiating within the engine a change to a new engine output torque. This new engine output torque, in conjunction with the electric motor operating state, is still managed by the HCP in order to provide some portion of the total input torque to the transmission required to propel the vehicle. From the point that the engine torque immediate request changes, the lead period expires, described above taking into account the differences in reaction times between the engine and the electric machine. After the lead period, a change to torque requests issued to the electric machine or machines, managed by the HCP in order to fulfill a portion of the operator torque request, is executed, and the electric machine changes the electric machine operating state, and as described above, the changes to the input torques provided by the engine and the electric machine change substantially simultaneously.

As described in the disclosed method above, engine torque immediate requests and torque requests to an electric machine are disclosed for use in parallel to control distinct torque generative devices with different reaction times to reaction to changes in operator torque request. Changes in operator torque request can include a simple change in desired output torque within a particular transmission operating range state, or changes in operator torque request can be required in conjunction with a transmission shift between different operating range states. Changes to operator torque requests in conjunction with a transmission shift are more complex than changes contained within a single operating range state because torques and shaft speeds of the various hybrid powertrain components must be managed in order to transition torque applied from a first clutch and to a second previously not applied clutch without the occurrence of slip, as described above.

Figure 4:
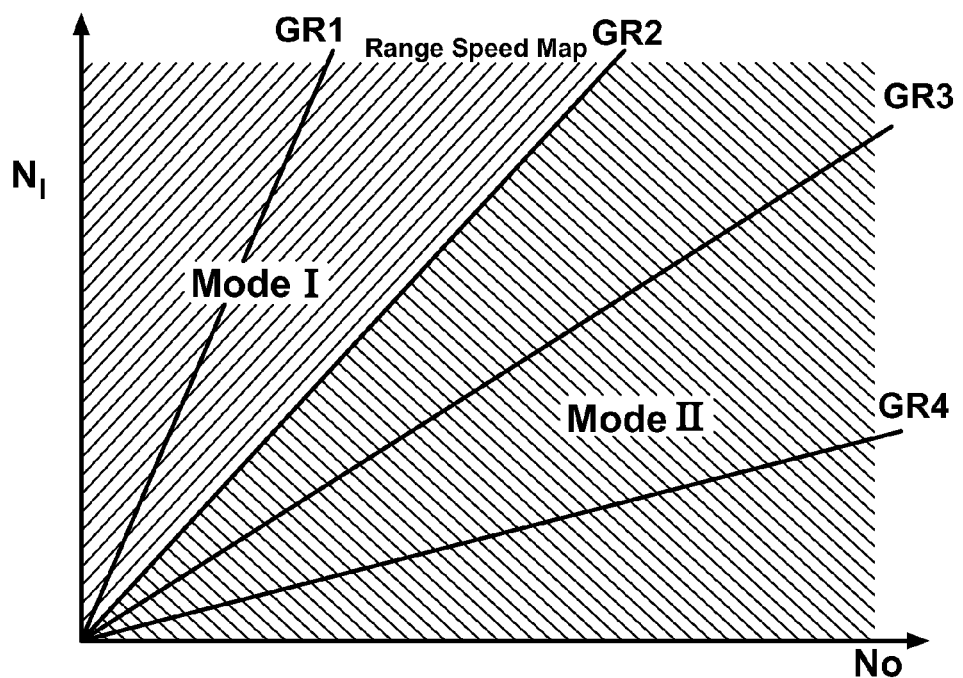
FIG. 4 demonstrates gear transition relationships for an exemplary hybrid powertrain transmission, in particular as described in the exemplary embodiment of FIG. 1 and Table 1, in accordance with the present disclosure.

Shifts within a transmission, such as the exemplary transmission of FIG. 1, frequently involve unloading a first clutch, transitioning through an inertia speed phase state, and subsequently loading a second clutch. Within the transmission of a conventionally powered vehicle utilizing an engine only, the change within a transmission from one fixed gear state to another fixed gear state frequently includes unloading a first clutch, allowing the vehicle to briefly coast, and then loading a second clutch. However, as described in relation to FIG. 1 and Table 1, above, clutches within a hybrid powertrain transmission are frequently applied in pairs or groups, and a shift within the transmission can involve only unloading one of the applied clutches and subsequently loading another clutch while maintaining engagement of a third clutch throughout the shift. FIG. 4 demonstrates gear transition relationships for an exemplary hybrid powertrain transmission, in particular as described in the exemplary embodiment of FIG. 1 and Table 1, in accordance with the present disclosure. $N_I$ is plotted against $N_O$. At any fixed gear state, $N_O$ is determined by the corresponding $N_I$ along the fixed gear state plots. Operation in either EVT Mode I or EVT Mode II, wherein a continuously variable gear ratio is utilized to power from a fixed input speed can take place in the respective zones illustrated on the graph. Clutch states, C1-C4, as described in the exemplary embodiment of FIG. 1, are described in Table 1. For instance, operation in a second fixed gear state requires clutches C1 and C2 to be applied or loaded and clutches C3 and C4 to be not applied or unloaded. While FIG. 4 describes gear transitions possible in the exemplary powertrain illustrated in FIG. 1, it will be appreciated by one having ordinary skill in the art that such a description of gear transitions is possible for any transmission of a hybrid powertrain, and the disclosure is not intended to be limited to the particular embodiment described herein.

FIG. 4 can describe operation of an exemplary system in a fixed gear state or EVT mode, as described above, and it can also be used to describe shift transitions between the various transmission operating range states. The areas and plots on the graph describe operation of the operating range states through transitions. For example, transitions between fixed gear states within an EVT mode region require transitory operation in the EVT mode between the fixed gear states. Similarly, transition from EVT Mode I to EVT Mode II requires a transition through the second fixed gear state, located at the boundary between the two modes.

In accordance with FIGS. 1 and 4 and Table 1, an exemplary transmission shift from a third fixed gear state to a fourth fixed gear state is further described. Referring to FIG. 4, both the beginning and the preferred operating range states exist within the area of EVT Mode II. Therefore, a transition from the third gear state to the fourth gear state requires first a shift from the third fixed gear state to EVT Mode II and then a shift from EVT Mode II to the fourth fixed gear state. Referring to Table 1, a hybrid powertrain transmission, beginning in a third fixed gear state, will have clutches C2 and C4 applied. Table 1 further describes operation in EVT Mode II, the destination of the first shift, to include clutch C2 applied. Therefore, a shift from the third fixed gear state to EVT Mode II requires clutch C4 to be changed from an applied to a not applied state and requires that clutch C2 remain applied. Additionally, Table 1 describes operation in the fourth fixed gear mode, the destination of the second shift, wherein clutches C2 and C3 are applied. Therefore, a shift from EVT Mode II to the fourth fixed gear state requires clutch C3 to be applied and loaded and requires that clutch C2 remain applied. Therefore, clutches C4 and C3 are transitioned through the exemplary shift, while clutch C2 remains applied and transmitting torque to the driveline throughout the shift event.

Figure 5:
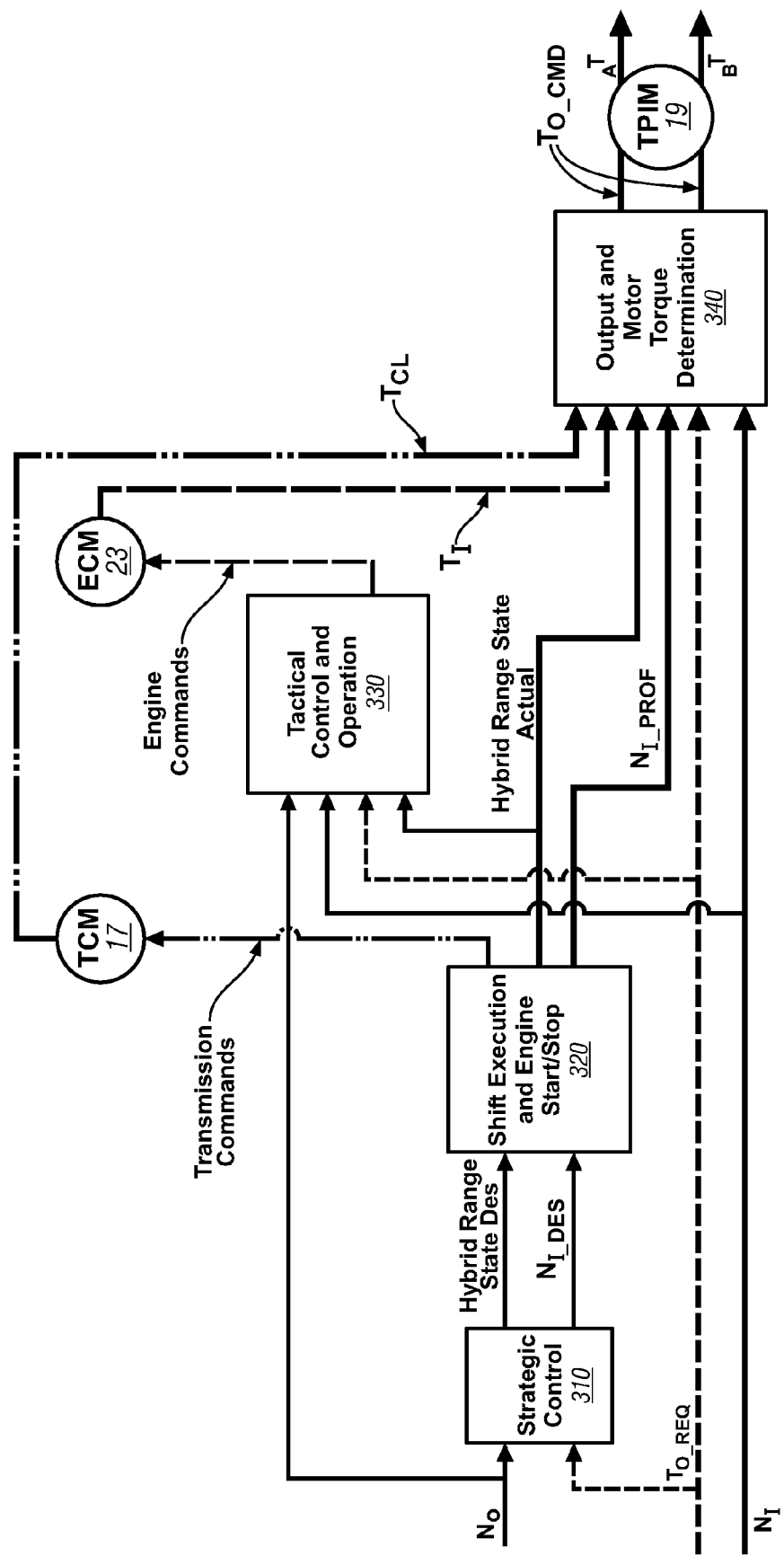
FIG. 5 shows an exemplary control system architecture for controlling and managing torque and power flow in a powertrain system having multiple torque generative devices and residing in control modules in the form of executable algorithms and calibrations, in accordance with the present disclosure.

FIG. 5 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 5 depicts a flow of pertinent signals through the control modules. In operation, the operator inputs to the accelerator pedal 113 and the brake pedal 112 are monitored to determine the operator torque request ('$T_{O\_REQ}$'). Operation of the engine 14 and the transmission 10 are monitored to determine the input speed ('$N_I$') and the output speed ('$N_O$'). A strategic optimization control scheme ('Strategic Control') 310 determines a preferred input speed ('$N_{I\_DES}$') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('$N_{I\_PROF}$') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('$T_{CL}$') for each clutch is estimated in the TCM 17, including the presently applied clutches and the non-applied clutches, and a present engine input torque ('$T_I$') reacting with the input member 12 is determined in the ECM 23. A motor torque control scheme ('Output and Motor Torque Determination') 340 is executed to determine the preferred output torque from the powertrain ('$T_{O\_CMD}$'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figures 6, 6A:
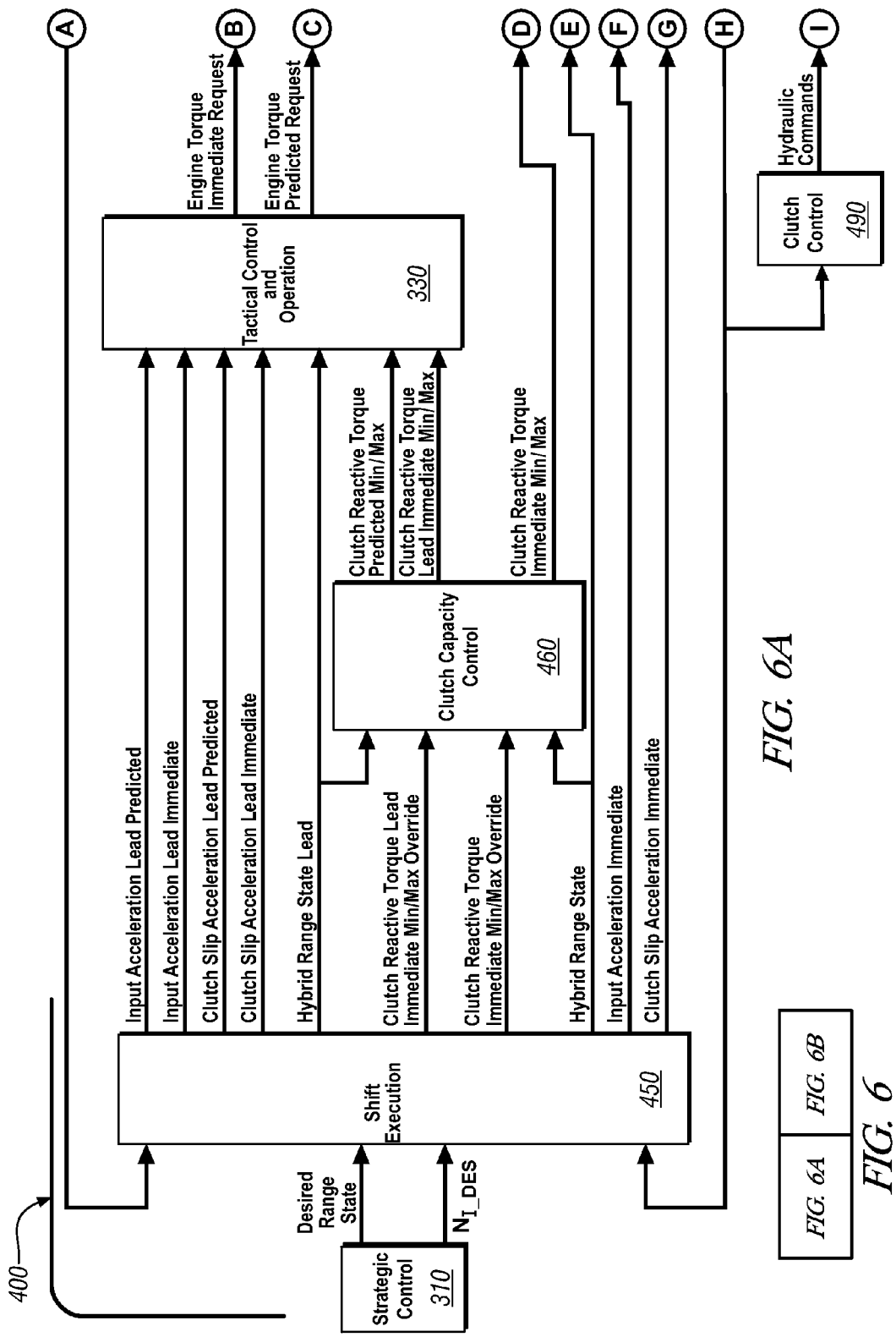
FIG. 6 is a schematic diagram exemplifying data flow through a shift execution, describing more detail exemplary execution of the control system architecture of FIG. 5 in greater detail, in accordance with the present disclosure.
Figure 6B:
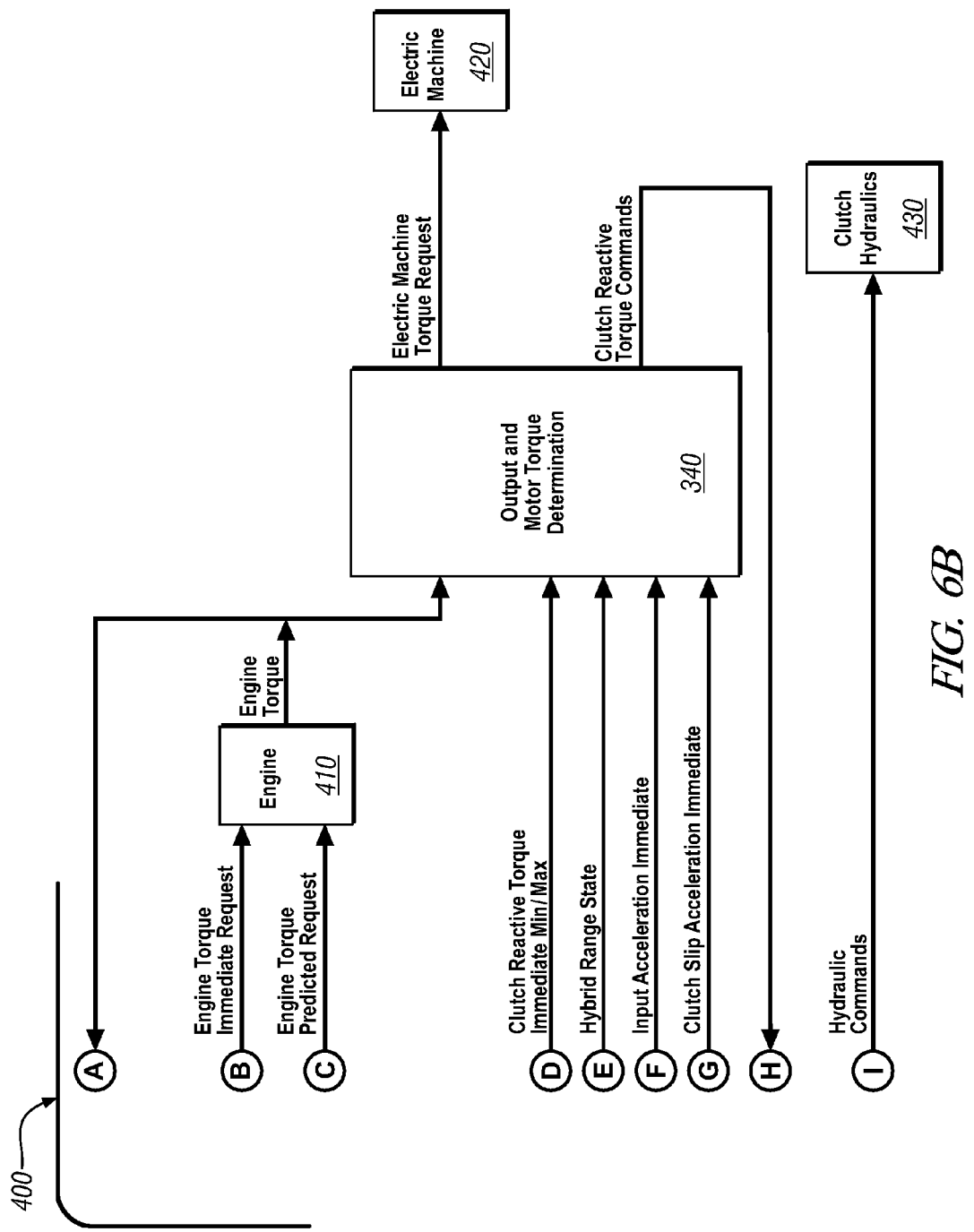

FIG. 6 is a schematic diagram exemplifying data flow through a shift execution, describing more detail exemplary execution of the control system architecture such as the system of FIG. 5 in greater detail, in accordance with the present disclosure. Powertrain control system 400 is illustrated comprising several hybrid drive components, including an engine 410, an electric machine 420, and clutch hydraulics 430. Control modules strategic control module 310, shift execution module 450, clutch capacity control module 460, tactical control and operation module 330, output and motor torque determination module 340, and clutch control module 490, are illustrated, processing information and issuing control commands to engine 410, electric machine 420, and clutch hydraulics 430. These control modules can be physically separate, can be grouped together in a number of different control devices, or can be entirely performed within a single physical control device. Module 310, a strategic control module, performs determinations regarding preferred powertrain operating points and preferred operating range states as described in FIG. 5. Module 450, a shift execution module, receives input from strategic control module 310 and other sources regarding shift initiation. Module 450 processes inputs regarding the reactive torque currently transmitted through the clutch and the preferred operating range state to be transitioned to. Module 450 then employs programming, determining parameters for the execution of the shift, including hybrid range state parameters describing the balance of input torques required of the torque providing devices, details regarding a target input speed and input acceleration lead predicted required to execute the transition to the preferred operating range state, an input acceleration lead immediate as previously described, and clutch reactive torque lead immediate minimum and maximum and clutch reactive torque immediate minimum and maximum values as previously described. From module 450, clutch reactive torque parameters and hybrid range state information are fed to clutch capacity control module 460, lead control parameters and signals are fed to tactical control and operation module 330, and immediate control parameters and signals are fed to output and motor torque determination module 340. Clutch capacity control module 460 processes reactive torque and hybrid range state information and generates logic describing clutch reactive torque limits enabling engine control through module 330, electric machine control through module 340, and clutch control through module 490, in accordance with methods described herein. Tactical control and operation module 330 includes means to issue torque requests and execute limits upon input torque supplied from engine 410, and feed, additionally, describe the input torque supplied from the engine to module 340 for use in control of electric machine 420. Output and motor torque determination module 340 likewise receives and processes information to issue electric machine torque requests to electric machine 420. Additionally, module 340 generates clutch reactive torque commands for use by clutch control module 490. Module 490 processes information from modules 460 and 340 and issues hydraulic commands in order to achieve the required clutch torque capacity required to operate the transmission. This particular embodiment of data flow illustrates one possible exemplary process by which a vehicular torque generative devices and related clutches can be controlled in accordance with the method disclosed herein. It will be appreciated by one having ordinary skill in the art that the particular process employed can vary, and this disclosure is not intended to limited to the particular exemplary embodiment described herein.

Powertrain strategic control, as described above, generates a desired behavior of the engine and electric machine or machines in order to generate a coordinated output torque. Outputs from strategic control include $N_{I\_DES}$ and $N_{I\_DOT\_DES}$, describing preferred behavior of $N_I$ in accordance with a desired overall behavior of the powertrain. From $N_{I\_DES}$ and $N_{I\_DOT\_DES}$, control signals must be developed to implement the coordinated control of the engine and electric machine or machines. In the exemplary embodiment of FIG. 6, outputs from strategic control module 310 must be utilized by shift execution module 450 in order to create coordinated control signals for use by tactical control and operation module 330 and output and motor torque determination module 340. A method is disclosed for generating control signals for a hybrid powertrain based upon a preferred input speed signal.

In powertrain operation, particularly in either EVT mode or in transitions through an EVT mode, strategic optimization determines a desired input speed ($N_{I\_DES}$) at which the powertrain would be ideally run. In order to smoothly control $N_I$ to $N_{I\_DES}$, shift execution determines a number of signals useful to control the torque generative devices. These determined signals can be divided according to the device being controlled. As described above, lead signals are used to control the engine, and immediate signals, delayed from the lead signals by a lead period, are used to control the electric machine or machines. Due to the need for quickly executed powertrain output transitions and transmission shifts and due to the relatively long reaction times of the engine to engaging command changes, $N_{I\_DES}$ must be quickly transitioned to a lead command signal. After the lead command signal has been determined, the immediate command signal can be determined along with a feedback control signal to assist in tuning electric machine control to engine output resulting from the lead command signal.

Figure 7:
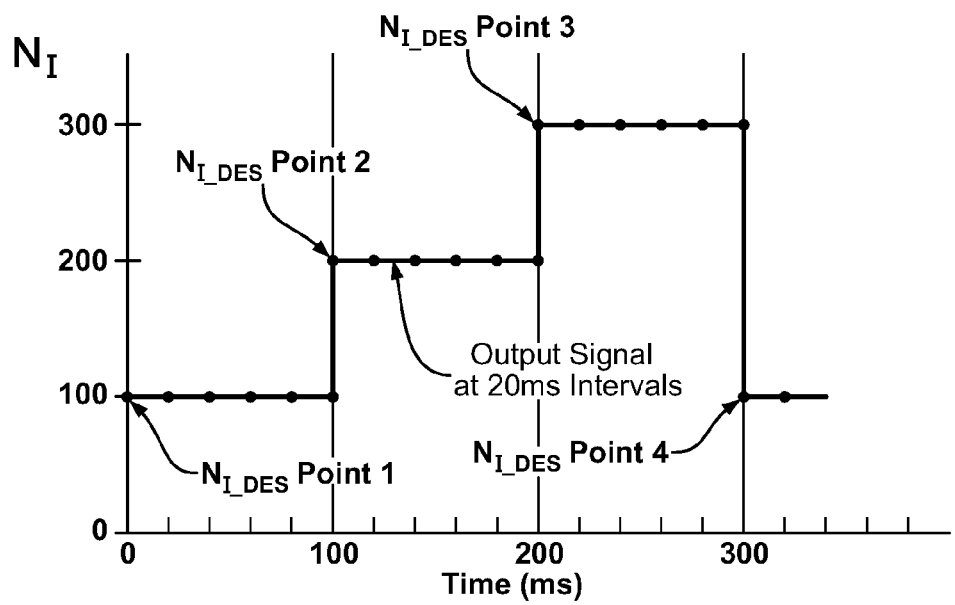
FIG. 7 graphically illustrates an exemplary set of data points generated at a longer interval and a set of resulting output points at shorter intervals, with no signal processing methods applied, in accordance with the present disclosure.
Figure 8:
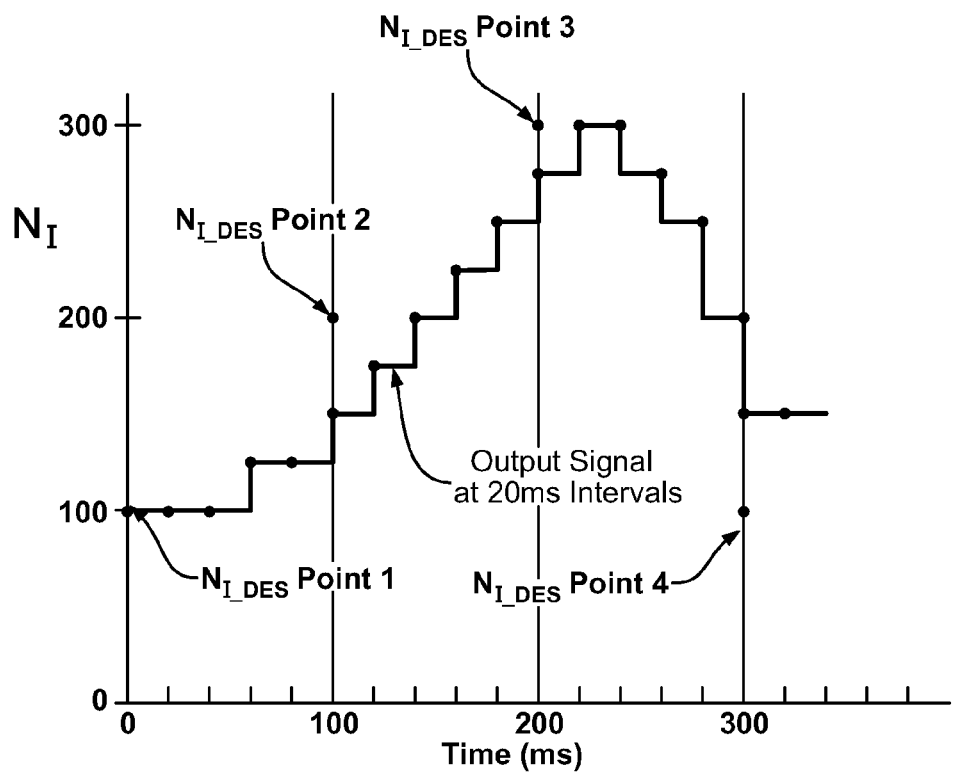
FIG. 8 graphically illustrates an exemplary set of data points generated at a longer interval and a set of resulting output points at shorter intervals, with signal processing methods applied to generate a smoother output signal, in accordance with the present disclosure.

As will be appreciated by one having ordinary skill in the art, signal processing includes methods to manipulate and filter data in different or noisy forms into usable signals. One issue addressed in signal processing is different data sample rates. Different powertrain systems, utilizing processors to transform inputs into outputs, operate at different processing speeds and generate data with different sample rates. Problems occur when a signal generated at a slow processing speed is utilized to control a system operating at a higher sample rate. For example, an exemplary strategic control module might issue $N_{I\_DES}$ signals, updating signal data points every 100 ms. An exemplary output and motor torque determination module, receiving immediate control commands and issuing commands to the electric machine might update command signals every 20 ms. Without signal processing, electric machine commands based upon a smooth pattern of $N_{I\_DES}$ data points updating every 100 ms would create a choppy pattern of electric machine commands in a step pattern every 20 ms. FIG. 7 graphically illustrates an exemplary set of data points generated at a longer interval and a set of resulting output points at shorter intervals, with no signal processing methods applied, in accordance with the present disclosure. As described above, the resulting output is a choppy pattern with intermittent step movements directly tracing the long period input data points. Any movement in the input data, creates noise or error in the output signal based solely on the different sampling rates. By applying signal processing techniques such as a moving average filter and feed-forward modifiers, data points between the original, longer period input data points can be interpolated in the output. FIG. 8 graphically illustrates an exemplary set of data points generated at a longer interval and a set of resulting output points at shorter intervals, with signal processing methods applied to generate a smoother output signal, in accordance with the present disclosure. As is known in the art, a moving average filter looks at some sample of historical values, and outputs an average of those terms. Depending upon average historical values, increasing or decreasing new data points will cause the output values to trend in the direction of the new data points, with a time lag. Additionally, as is well known in the art, a feed-forward modifier can be utilized, using an additional piece of information describing an overall data trend to forecast movements in the resulting data set. Applied to FIG. 8, a moving average filter can be utilized to follow trends in the input data, creating incremental movements in the output values in gradual steps. Additionally, information related to predicted or preferred change in the input data can be used as a feed-forward modifier to predictively adjust the output data in the direction of anticipated change. As can be seen in the exemplary output data of FIG. 8, applying signal processing methods as described above can be utilized to smooth output data and interpolate trends between input data points.

Figure 9:
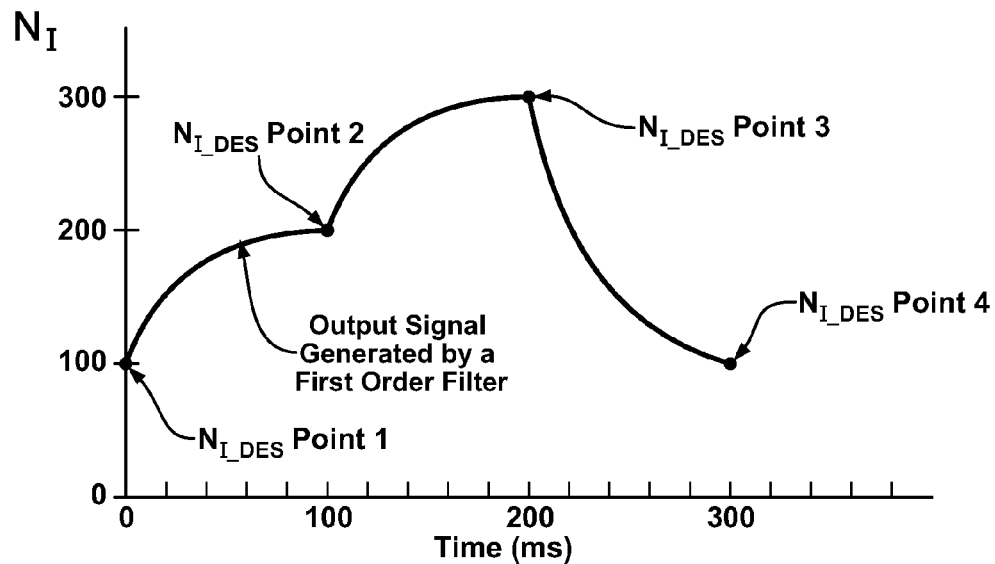
FIG. 9 graphically illustrates exemplary output data generated by applying a first order filter, in accordance with the present disclosure.

Other methods of signal processing are known. For example, a low pass filter can be utilized to remove high frequency, transient, or abnormal errors in the input data in favor of longer term, lower frequency patterns in the data. Additionally, a first order filter is known to adjust between long period data points by providing a set of interpolated values in a parabolic shape. FIG. 9 graphically illustrates exemplary output data generated by applying a first order filter, in accordance with the present disclosure. Changes in the input data points are adjusted in the output data by an initially high rate of change, diminishing or decaying as the output values get closer to the next input value. Additionally, integration of a signal is known to accumulate a quantitative summation of a signal through a time period. For example, an integration of acceleration of an object through a time period yields the overall change in velocity of the object through that time period. Additionally, a calibrated time lag can be utilized to adjust or synchronize an output data flow with some other process.

Figure 10:
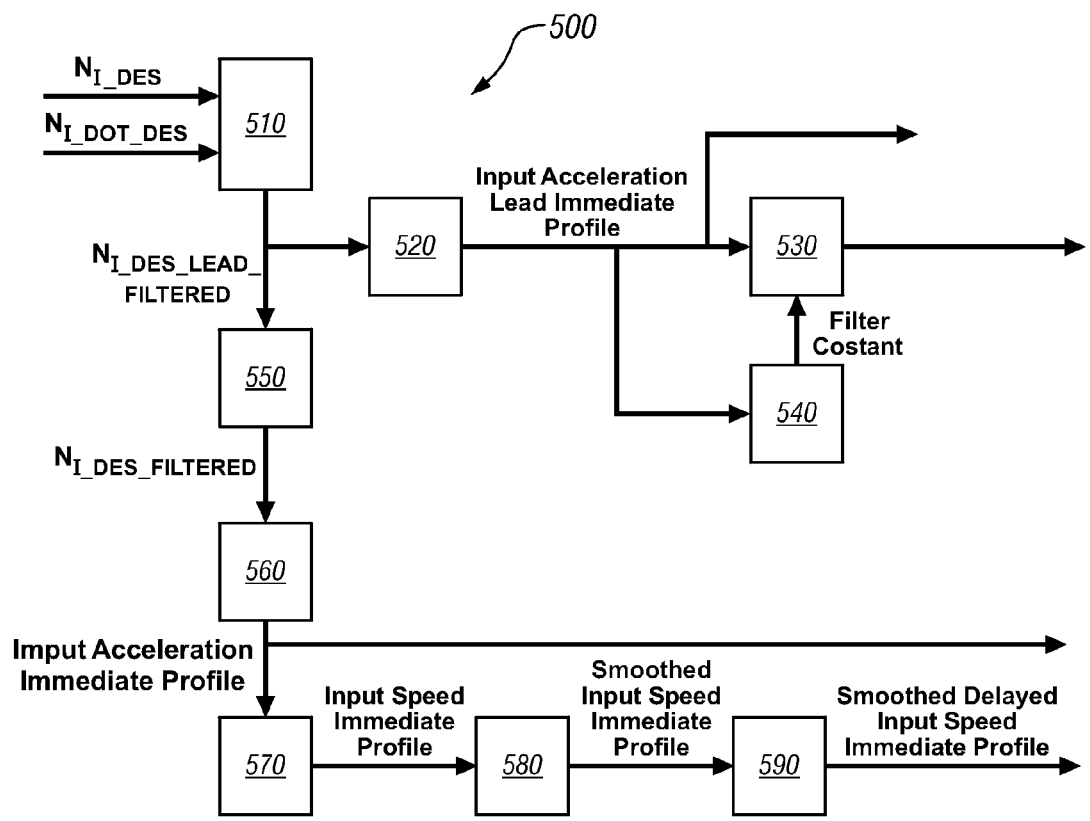
FIG. 10 illustrates an exemplary dataflow describing an exemplary method that can be utilized to convert a long period desired input speed signal to a set of short period lead and immediate command signals for use in powertrain control, utilizing signal processing methods, in accordance with the present disclosure.

FIG. 10 illustrates an exemplary dataflow describing an exemplary method that can be utilized to convert a long period desired input speed signal to a set of short period lead and immediate command signals for use in powertrain control, utilizing signal processing methods, in accordance with the present disclosure. Dataflow 500 begins with data inputs describing $N_{I\_DES}$ and $N_{I\_DOT\_DES}$. These inputs are generated by a strategic control module (not shown) at some sample rate lower than the sample rate needed in the command signals to be generated in the dataflow. The inputs are processed in block 510 through application of a moving average filter, utilizing historical values of $N_{I\_DES}$ through some time period to output an average value, and through application of a feed-forward modifier based upon $N_{I\_DOT\_DES}$ in accordance with the method described in association with FIG. 8. Block 510 outputs a term $N_{I\_DES\_LEAD\_FILTERED}$. As a non-delayed term, this signal begins the basis for the lead control signals to be generated to support engine commands. As described above, the term is also filtered to interpolate behavior in short period increments based upon long period inputs. This term is fed through two subsets of the dataflow, one subset comprising blocks 520-540 outputting lead control signals and the second subset comprising blocks 550-590 outputting immediate control signals. Block 520 inputs $N_{I\_DES\_LEAD\_FILTERED}$ and applies a low pass filter to remove transient or noisy data points in the signal. In addition, block 520 applies programmed limits in the generated data based upon system constraints. For example, $N_I$, input acceleration ('$N_{I\_DOT}$'), and rate of change in input acceleration ('$N_{I\_DOUBLEDOT}$') have limits.

Figure 11:
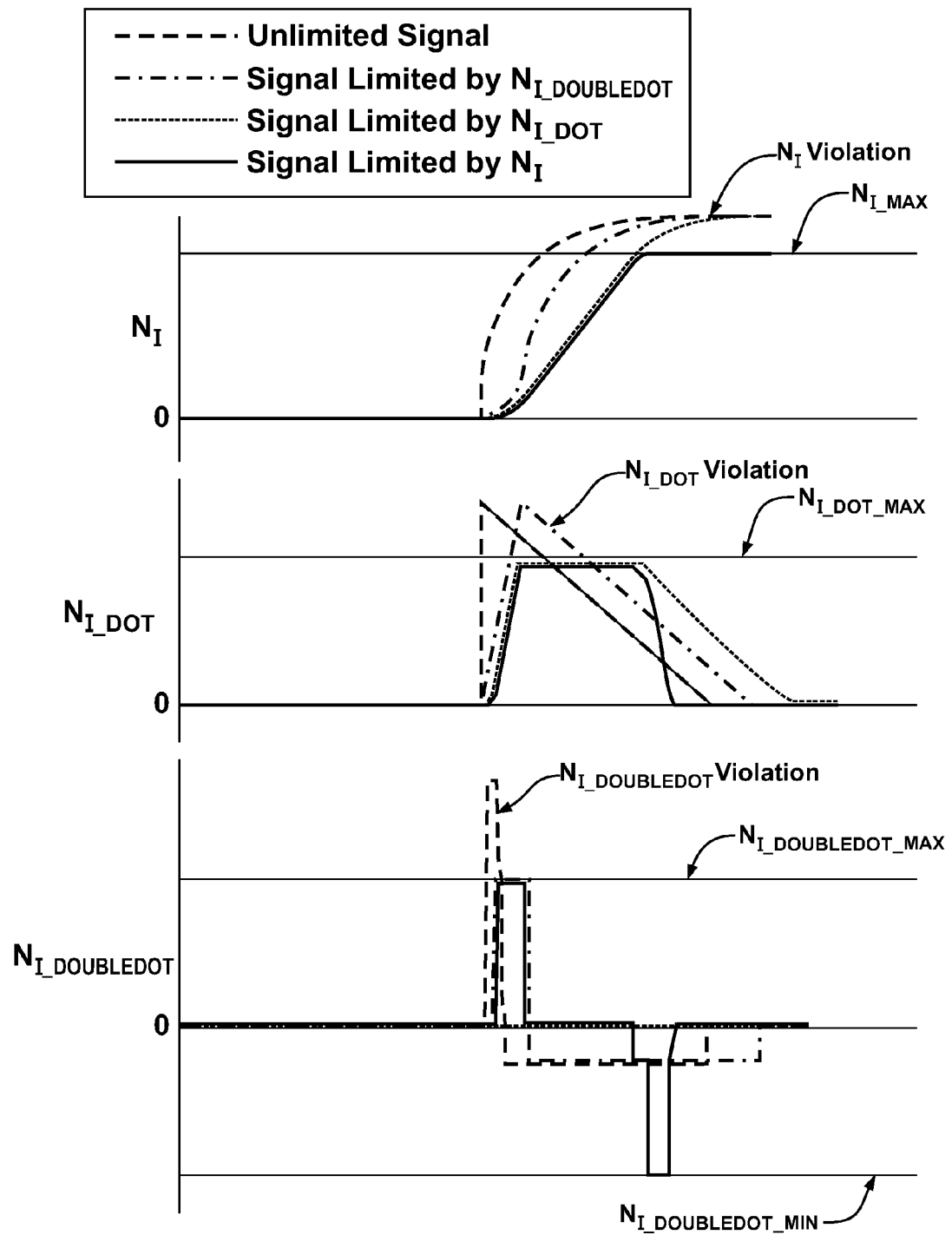
FIG. 11 graphically illustrates examples of limits upon $N_I$ and related terms, in accordance with the present disclosure.

FIG. 11 graphically illustrates examples of limits upon $N_I$ and related terms, in accordance with the present disclosure. $N_I$, $N_{I\_DOT}$, and $N_{I\_DOUBLEDOT}$ are each depicted in separate sections against a common timescale. An unlimited signal is depicted in each section describing an exemplary $N_{I\_DES\_LEAD\_FILTERED}$ term describing an desired input speed behavior as intended by a strategic control module. Each section of the graph includes limiting or maximum and minimum values that each term must stay within as dictated by the particular powertrain. An exemplary method is described wherein limits according to each term are applied to the signal and the effects of each limit change the behavior of the resulting signal. Limits are applied in an order in this example, but it will be recognized that the limits could be applied in different orders. A signal limited by $N_{I\_DOUBLEDOT}$ is depicted, wherein an $N_{I\_DOUBLEDOT}$ violation is depicted in the bottom section of the graph. Acceleration cannot change instantly, and changes are made to the resulting plots illustrating a limit to the rate at which acceleration can change. A signal limited by $N_{I\_DOT}$ is depicted, previously modified according to the $N_{I\_DOUBLEDOT}$ violation, wherein an $N_{I\_DOT}$ violation is depicted in the center section of the graph. Input speed cannot be accelerated too quickly, and an imposed maximum acceleration results in changes to the depicted plots. Finally, a signal limited by $N_I$ is depicted, limited previously by the other limiting terms, wherein an $N_I$ violation is depicted in the top section of the graph. Physical limitations of the input member, including physical limitation of the attached engine or limitations in the transmission, can require that a maximum input speed be imposed, and an imposed maximum input speed results in changes to the depicted plots. The signal limited by $N_I$ also depicts an additional ramp downward to zero, in which conflict with the minimum $N_{I\_DOUBLEDOT}$ must be observed. In this way, limits to $N_I$, $N_{I\_DOT}$, and $N_{I\_DOUBLEDOT}$ can be imposed upon a signal, resulting in a signal conditioned to fall within limits of system constraints.

Returning to FIG. 10, block 520 applies programmed limits in the generated data based upon system constraints. Block 520 outputs the input acceleration lead immediate profile, describing commands that must be given to the engine in a powertrain transition. Block 530 inputs the input acceleration lead immediate profile and applies a first order filter and additionally applies a filter constant to mute the effects of the powertrain transition upon the signal. The operations performed by block 530 have the effect of smoothing the input acceleration lead immediate profile and filters out transitory effects expected through the powertrain transition in order to forecast a likely input acceleration to occur after the transition. Block 530 develops and outputs an input acceleration lead predicted profile term. Block 540 determines the filter constant utilized by block 530 from an exemplary lookup table or model describing typical acceleration behavior based upon the magnitude of the input acceleration lead immediate profile. In this way, the first subset of the dataflow depicted in FIG. 10 terminates at block 530, providing lead control signals for use in issuing engine commands.

As described above, the input acceleration lead immediate profile term is utilized to control the engine through a powertrain transition, whether the transition includes a simple change in output or a transmission shift. The hybrid powertrain transition is frequently desired to be a quick change, efficiently adjusting the powertrain from one operational setting to another. Engine responses to input acceleration lead immediate profile commands are frequently controlled by a change in engine spark timing rather than immediately changing a throttle position. While a throttle change may be more fuel efficient and may eventually be required based upon the new powertrain settings, a change in the engine spark can be commanded much more quickly than a change in throttle, therefore better conserving drivability through the powertrain transition. It will be appreciated that other methods can be utilized in place of spark timing to generate this effect, such as modifying timing of fuel injection. The input acceleration lead predicted profile, on the other hand, is useful to predict powertrain settings after the powertrain transition and can be used as a factor to control engine throttle changes in anticipation of operation after the transition is completed.

The second subset of the dataflow depicted in FIG. 10 comprises blocks 550 through 590 and provides immediate control signals for use in issuing electric machine commands. $N_{I\_DES\_LEAD\_FILTERED}$, developed in block 510, is an input to block 550, wherein the signal is delayed by the calibrated lead period, discussed above in relation to reaction times in the engine and the electric machines. This delayed signal, $N_{I\_DES\_FILTERED}$ forms the basis for immediate control signals useful to issue commands to the electric machines in coordination with lead control signals. Block 560 inputs $N_{I\_DES\_FILTERED}$, wherein a first order filter and limits related to $N_I$, $N_{I\_DOT}$, and $N_{I\_DOUBLEDOT}$ are applied, as described in relation to block 520, and an input acceleration immediate profile is generated. This signal describes changes to input speed required to support the present powertrain transition.

In order to improve electric machine accuracy, a reference term describing input speeds generated as a result of the input acceleration immediate profile is useful to operate corrective or feedback control. The input acceleration immediate profile is an input to block 570 which integrates the signal through a time period to generate an input speed immediate profile. This input speed immediate profile describes change in input speed, but further interpolation of the signal into a signal improved with shorter intervals between data points, for example, selected to match a sample rate of a closed loop speed controller, is beneficial to accurate electric machine control. Block 580 inputs the input speed immediate profile and applies a moving average filter which can be termed a smoothed input speed immediate profile. In order to provide a signal appropriate for real-time feedback control, the delay between the input acceleration immediate profile and actual electric machine response must be approximated and matched in the reference signal. As will be appreciated by one having ordinary skill in the art, the moving average filter in block 580 will provide some delay in the resulting smoothed input speed immediate profile. An additional calibrated delay is provided in block 590, generating a smoothed-delayed input speed profile, useful in feedback control of the electric machine or machines.

Figure 12:
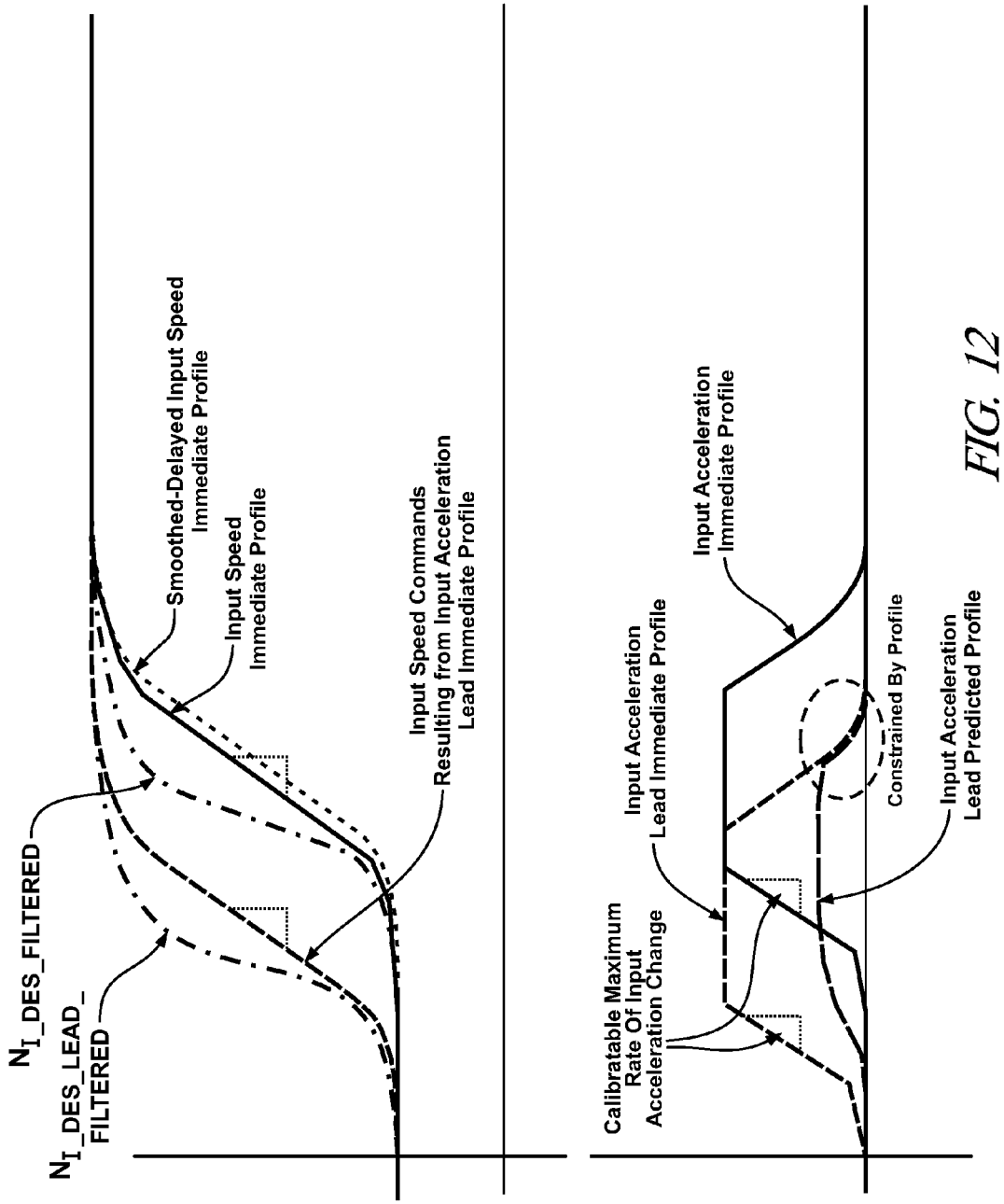
FIG. 12 graphically illustrates various terms described in the methods of FIG. 10, in accordance with the present disclosure.

FIG. 12 graphically illustrates various terms described in the methods of FIG. 10, in accordance with the present disclosure. $N_{I\_DES\_LEAD\_FILTERED}$ is depicted, illustrating an initially conditioned input signal describing $N_{I\_DES}$ from a strategic control module. $N_{I\_DES\_FILTERED}$ is also depicted, describing a delayed copy of the $N_{I\_DES\_LEAD\_FILTERED}$ signal, with the delay calibrated to a lead period for the powertrain torque generative devices. Input acceleration lead immediate profile is depicted, describing an input acceleration that, including limitations of the system, can most closely deliver $N_{I\_DES\_LEAD\_FILTERED}$. The resulting input speed commands resulting from the input acceleration lead immediate profile is also depicted. Input acceleration lead predicted profile describes a filtered version of the input acceleration lead immediate profile, band limiting and filtering out transient effects of the powertrain transition and predicting an eventual acceleration after the transition. It should also be noted that, as depicted, the input acceleration lead predicted profile can be limited by the input acceleration lead immediate profile, correcting the predicted profile by the progress of the lead immediate profile. Input acceleration immediate profile describes the delayed version of the input acceleration lead immediate profile, useful to control the electric machine or machines. The input speed immediate profile describes the raw results of integrating the input acceleration immediate profile for the purpose of creating a reference signal. The smoothed-delayed input speed immediate profile describes the interpolated and delayed version of the input speed immediate profile, useful for controlling a feedback speed control of the transmission members. This feedback control can be $N_I$ or $N_{CI}$ closed loop speed control. In this way, an input signal conveying a desired input speed can be utilized to control a synchronized hybrid powertrain.

Figure 13:
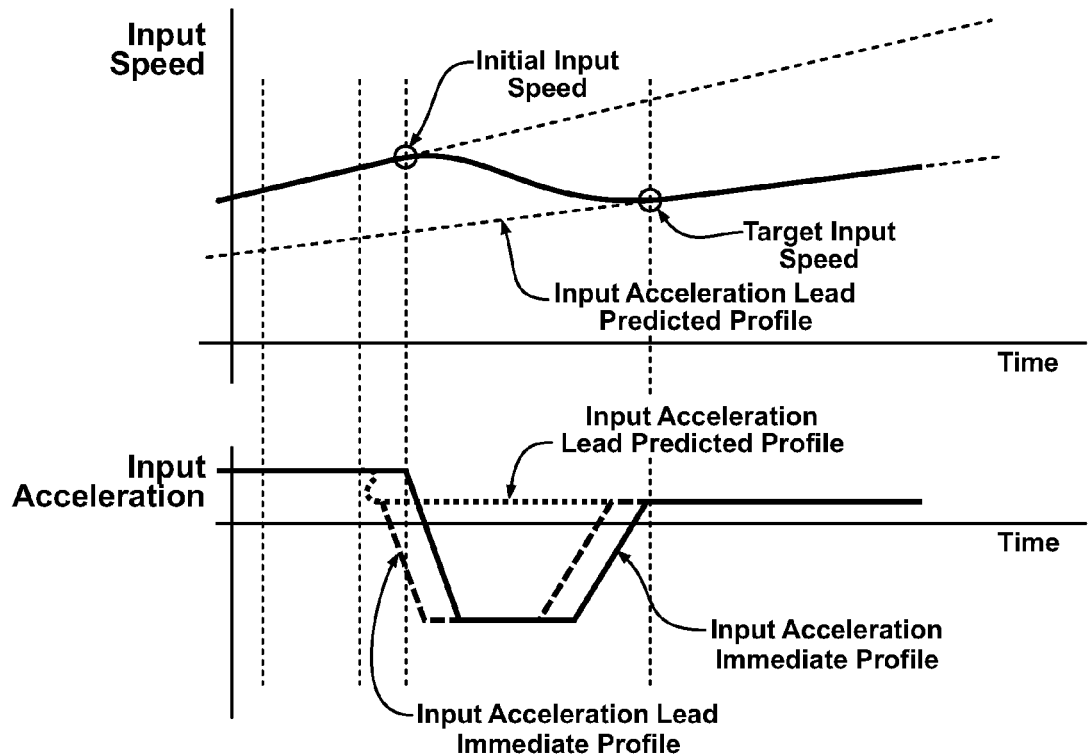
FIG. 13 depicts an exemplary processes combining to accomplish an an exemplary inertia speed phase of a transmission shift, in accordance with the present disclosure.

A transition in a hybrid powertrain can include a simple change in powertrain output within a transmission operating range state, or a transition can include a more complicated transmission shift including both changes to torque and changes to operating range state. Synchronization of commands through a shift event are important to drivability. An exemplary method to accomplish this synchronization through an inertia speed phase of a transmission shift is graphically depicted in FIG. 13, in accordance with the present disclosure. The effects of the transmission shift upon two terms descriptive of the shifting process are illustrated in two sections with a common timescale. The top section depicts the input speed of a shaft initially connected through the first, initially applied clutch. The upper dotted line represents a profile of the input speed while the first clutch is in a locked state before initiation of the shift. The bottom dotted line represents a profile of the input speed that must be achieved to synchronize the input speed with the output speed of the second clutch. The transition between the two dotted lines represents the change to input speed that must take place to accomplish the shift. The bottom section of FIG. 13 depicts input acceleration. Input acceleration is described in this case by two synchronized terms: the input acceleration lead immediate profile describes commands necessary to drive the engine through the required changes, and the input acceleration immediate profile describes commands necessary to drive the electric machine or machines through the same required changes, including a delay corresponding the a lead period. The input acceleration immediate profile closely tracks actual input acceleration. The initial flat portion in the input acceleration describes the acceleration with which the input speed is increased before the initiation of the shift, and this constant value reflects the slope of the input speed in the left portion of the top section of the FIG. 13. At the time of the initiation of the shift, based upon operator input such as pedal position and algorithms within the transmission control system, including determining a preferred operating range state, a determination is made regarding target input speed that will be required to achieve synchronization and the target input acceleration profile required to accomplish the shift. An input acceleration rate, calculated to support a target acceleration rate after the shift is completed, can be termed an input acceleration lead predicted and describes the input acceleration that needs to exist after the inertia speed phase is completed. Because, as described in the top portion of FIG. 13, the input speed must be changed through the inertia speed phase to accomplish the shift and because the input acceleration describes the rate of change of the input speed, the input acceleration of the device being controlled during the inertia speed phase must reflect the input speed change to be accomplished through the inertia speed phase. In the exemplary data displayed in FIG. 13, wherein the input speed needs to be reduced to accomplish the transmission shift, the input acceleration of the device necessarily must change to a negative value representing the change in input speed. Once the input speed has been reduced to a level enabling transition to the target input speed needed for synchronizing the input and output speeds, the input acceleration changes to match the input acceleration lead predicted. In this way, input speed and input acceleration can be controlled through an inertia speed phase to match a target input speed and target input acceleration necessary to achieve a smooth transmission shift.

Figure 14:
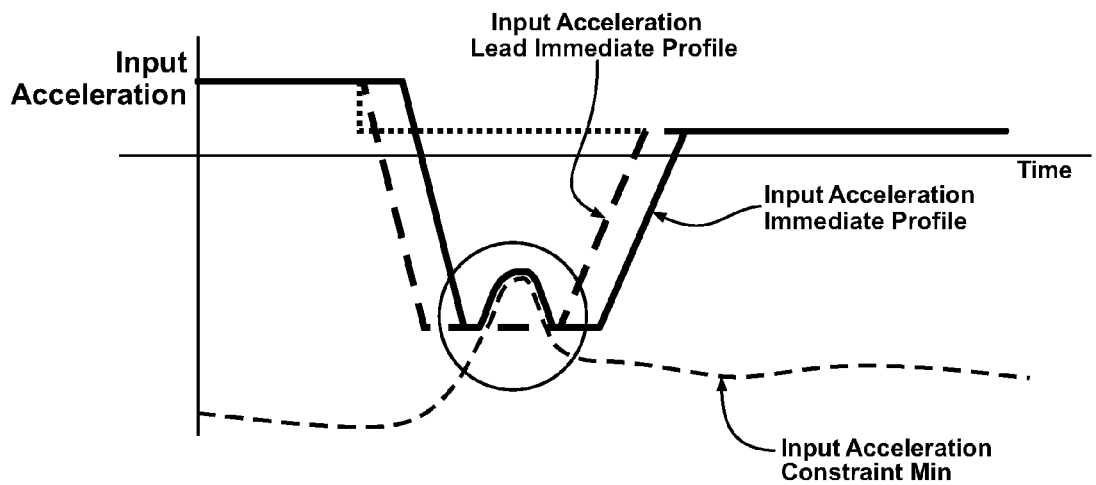
FIG. 14 is a graphical representation of an instance where a systemic restraint is imposed upon an immediate control signal, temporarily overriding values set by the control signal, in accordance with the present disclosure.

FIG. 14 graphically illustrates an instance in which an input acceleration lead immediate profile has been determined for engine control through an inertia speed phase, and additionally, a corresponding input acceleration immediate profile has been determined for electric machine control through the inertia speed phase. In an instance where negative input acceleration or deceleration is occurring to the engine in an inertia speed phase, this condition is most commonly an instance where the engine is simply being allowed to slow down by internal frictional and pumping forces within the engine. However, when an electric machine is decelerating, this condition is most commonly accomplished with the electric machine still under power, or conversely, operating in a generator mode. Because the electric machine is still operating under system control and with implications with the rest of vehicle's systems, the motor is still subject to systemic restraints, for instance, battery power available to drive the motor. FIG. 14 imposes such a systemic restraint in the minimum input acceleration constraint. Where such a restraint interferes with the input acceleration immediate profile, programming within the electric machine control system modify the input acceleration immediate profile to accommodate the constraint. Once the constraint no longer limits electric machine operation within the input acceleration immediate profile, the system operates to recover the input acceleration to the effect the desired changes to the input speed.

Filters including moving average filters, low pass filters, first order filters, delay mechanisms, integration, and differentiation are utilized in the above methods, and an exemplary configuration of these methods is provided. However, different configurations of powertrain control systems will require different arrangements of these methods and techniques, and the disclosure is not intended to be limited to the particular embodiments described herein. Additionally, signal processing methods well known in the art are contemplated for use in solving particular data issues not expressly described herein, however, it will be appreciated that any such methods known in the art are considered valid for use with the methods described herein.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain comprising an electro-mechanical transmission mechanically-operatively coupled to an internal combustion engine and an electric machine, said method comprising:
monitoring a desired input speed of an input shaft of the transmission;
signal processing said desired input speed to create a lead control signal to control said engine, wherein said signal processing comprises
low pass filtering said desired input speed, and
applying system constraint limits upon said desired input speed;
signal processing said desired input speed to create an immediate control signal to control said electric machine, wherein said signal processing comprises
delaying said desired input speed by a lead period,
low pass filtering said desired input speed, and
applying system constraint limits upon said desired input speed; and
controlling said powertrain through a powertrain transition based upon said lead control signal and said immediate control signal;

wherein the engine and the electric machine simultaneously transmit torque independently to the transmission through separate inputs; and wherein a speed of the engine and a speed of the electric machine change independently.

2. The method of claim 1, wherein said transmission is further coupled to a second electric machine, and wherein said signal processing creating said immediate control signal further creates a second immediate control signal to control said second electric machine.

3. The method of claim 1, further comprising applying a moving average filter to said desired input speed prior to said signal processing.

4. The method of claim 3, further comprising:

monitoring a desired input acceleration; and utilizing said desired input acceleration as a feed forward modifier of said desired input speed in combination with said moving average filter.

5. The method of claim 1, wherein said lead control signal comprises an input acceleration lead immediate profile, and wherein said method further comprises applying a low pass filter and a filter constraint to said input acceleration lead immediate profile to generate an input acceleration lead predicted profile describing a predicted operation of said powertrain after said powertrain transition.

6. The method of claim 5, wherein said input acceleration lead immediate profile is used to control a spark timing of said engine, and wherein said input acceleration lead predicted profile is used to control a throttle setting of said engine.

7. The method of claim 1, wherein said immediate control signal comprises an input acceleration immediate profile, and wherein said method further comprises integrating said input acceleration immediate profile to generate an input speed immediate profile useful to implement a feedback control of an input speed.

8. The method of 7, further comprising applying a moving average filter and a delay to said input speed immediate profile generating a smoothed-delayed input speed immediate profile useful to provide feedback control to said input speed at a same sample rate as an input speed feedback controller and synchronized with electric machine output.

9. Method for controlling a powertrain comprising an electro-mechanical transmission mechanically-operatively coupled to an internal combustion engine and an electric machine, said method comprising:

monitoring a desired input speed of an input shaft of the transmission generated at a sample rate lower than a sample rate used in commands to said engine and lower than a sample rate used in commands to said electric machine;

generating a desired lead filtered input speed with a sample rate higher than said desired input speed by applying a moving average filter to said desired input speed;

signal processing said desired lead filtered input speed to create a lead control signal to control said engine, wherein said signal processing comprises low pass filtering said desired lead filtered input speed, and applying system constraint limits upon said desired lead filtered input speed;

signal processing said desired lead filtered input speed to create an immediate control signal to control said electric machine, wherein said signal processing comprises delaying said desired lead filtered input speed by a lead period, low pass filtering said desired lead filtered input speed, and applying system constraint limits upon said desired lead filtered input speed; and controlling said powertrain through a powertrain transition based upon said lead control signal and said immediate control signal;

wherein the engine and the electric machine simultaneously transmit torque independently to the transmission through separate inputs; and wherein a speed of the engine and a speed of the electric machine change independently.

10. The method of claim 9, further comprising monitoring a desired input acceleration, wherein said generating said desired lead filtered input speed with a sample rate higher than said desired input speed further includes applying a feed-forward modifier based upon said desired input acceleration.

* * * * *